United States Patent [19]

Munro

[11] 4,370,924
[45] Feb. 1, 1983

[54] AGRICULTURAL BALERS

[75] Inventor: James A. Munro, Aylesbury, England

[73] Assignee: Sperry Corporation, New Holland, Pa.

[21] Appl. No.: 172,597

[22] Filed: Jul. 28, 1980

[51] Int. Cl.³ ............................................. B30B 15/30
[52] U.S. Cl. ...................................... 100/189; 56/341
[58] Field of Search ........................ 100/188, 189, 142; 56/341, 342, 343; 198/517, 740

[56] References Cited

U.S. PATENT DOCUMENTS

| 3,351,002 | 11/1967 | McDuffie | 100/189 |
| 3,515,058 | 6/1970 | Ginhoven et al. | 100/189 |
| 3,517,609 | 6/1970 | Smith et al. | 100/189 |
| 3,724,363 | 4/1973 | Nolt | 100/189 |

Primary Examiner—Peter Feldman
Attorney, Agent, or Firm—Darrell F. Marquette; Frank A. Seemar

[57] ABSTRACT

A baler for baling crop material, comprising a feed mechanism including two relatively slidable elongate support members (6, 10) carrying a plurality of depending feed fingers (7, 9, 18), a feed area (1) within which the feed fingers are movable, a bale chamber communicating with one end of the feed area (1) and a bale plunger (25) reciprocable within the bale chamber, the two support members (6, 10) being constrained to move in continuous loop-like paths during a lower run of which one of the support members (6) leads and the other (10) trails as the feed fingers (7, 9, 18) engage the crop material within the feed area (1) and transfer the crop material towards, respectively into the bale chamber, at least one of the feed fingers (18) being mounted on the trailing support member (10) to ensure that crop material disposed at the other end of the feed area (1) is moved towards the bale chamber, thereby preventing an accumulation of crop material at the other end of the feed area.

4 Claims, 3 Drawing Figures

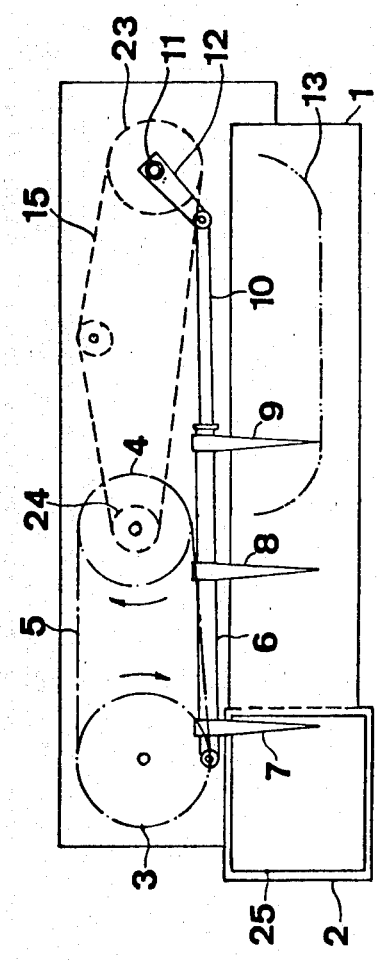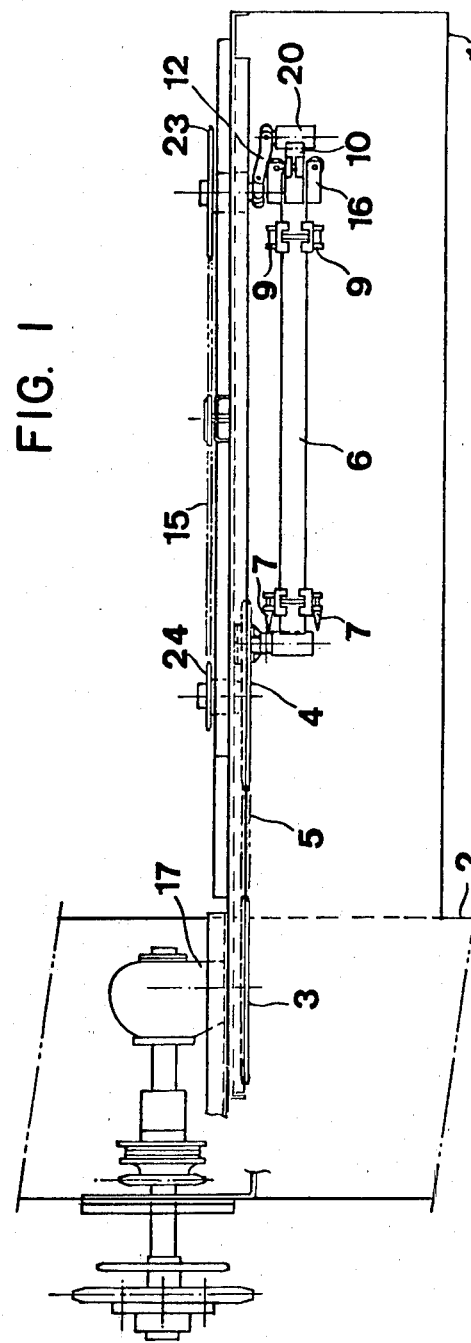

AGRICULTURAL BALERS

BACKGROUND OF THE INVENTION

This invention relates to agricultural balers for baling crop material. Known balers, for example of the form disclosed in U.S. Pat. No. 3,517,609, have a crop feed mechanism including a plurality of feed fingers which move in a continuous loop-like path in a feed area to which crop material is delivered from the field. The feed fingers engage the crop material within the feed area and move the crop material to a bale chamber wherein the crop material is compacted into bales by a reciprocable bale plunger.

In such balers it has been found that the feed fingers do not adequately clear crop material from the lower corner of the end of the feed area remote from the bale chamber, causing an accumulation of crop material in this corner of the feed area which ultimately results in an uneven feeding to the bale chamber. Build up of crop material in this corner of the feed area is unsatisfactory and it has been proposed to solve this problem by shielding off this corner of the feed area with a metal panel. The invention aims to solve this problem in a different manner and without reducing the volume of the feed area.

SUMMARY OF THE INVENTION

According to the invention a baler for baling crop material comprises a feed mechanism including two relatively slidable elongate support members carrying a plurality of depending feed fingers, a feed area within which the feed fingers are movable, a bale chamber communicating with one end of the feed area and a bale plunger reciprocable within the bale chamber, the two support members being constrained to move in continuous loop-like paths during a lower run of which one of the support members leads and the other trails as the feed fingers engage the crop material within the feed area and transfer the crop material towards, respectively into the bale chamber, at least one of the feed fingers being mounted on the trailing support member to ensure that crop material disposed at the other end of the feed area is moved towards the bale chamber, thereby preventing an accumulation of crop material at the other end of the feed area.

Hence, the invention solves the problem set out above by providing one or more feed fingers on the support member which trails the other support member during the lower run of the feed fingers when the latter move the crop material towards, respectively into the bale chamber.

The continuous loop-like paths in which the two support members move, lie in a substantially vertical plane. The feed fingers or fingers mounted on the trailing support member are preferably attached to the latter at the trailing end thereof and the trailing end of the trailing support member is preferably constrained to move in a circular path, conveniently by being connected to a crank arm, while that the leading support member is constrained to move in an elongated continuous loop-like path.

BRIEF DESCRIPTION OF THE DRAWINGS

The invention will now be described in greater detail, by way of example, with reference to the accompanying drawings in which:

FIG. 1 is a diagrammatic rear elevation of a prior art crop baler and is based on FIG. 7 of the aforesaid U.S. Pat. No. 3,517,609.

FIG. 3 is a plan view of the structure shown in FIG. 2.

DETAILED DESCRIPTION OF THE PREFERRED EMBODIMENT

Figure 2:
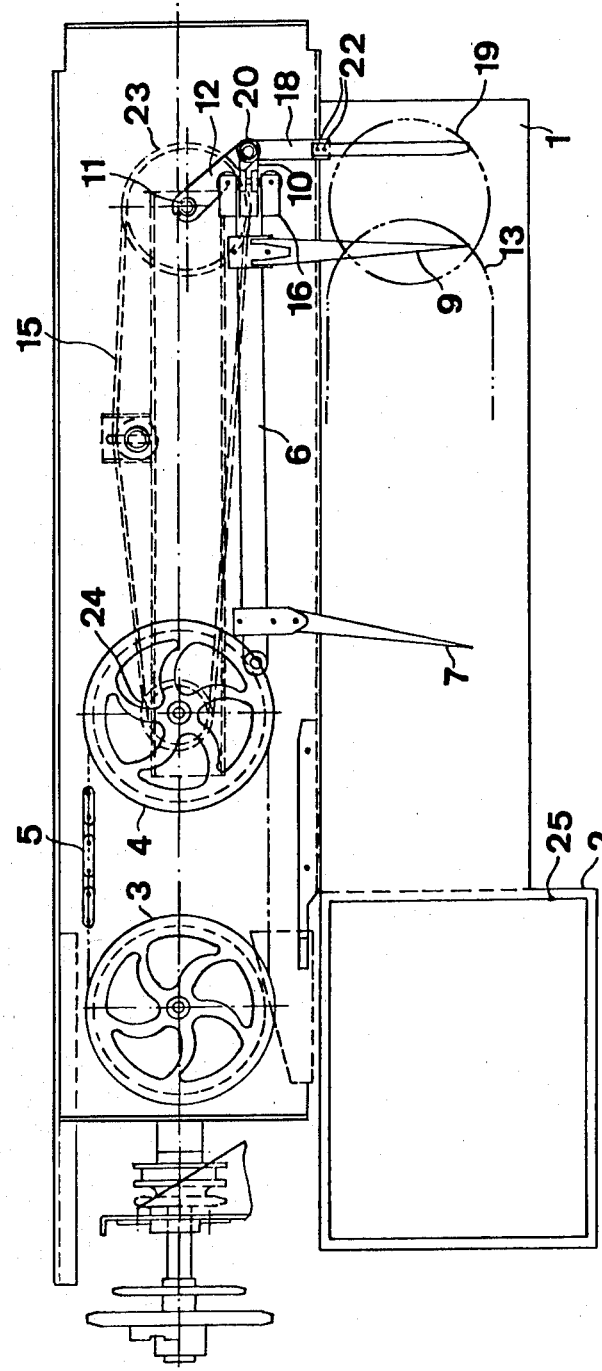
FIG. 2 is a diagrammatic rear elevation of a baler embodying the present invention.

In the following description right-hand, left-hand, forward, and rearward references are determined by standing at the rear of the crop baler and facing in the direction of operative travel.

The disadvantage of known crop balers referred to above is illustrated in FIG. 1 for a better understanding of the aspects of the invention.

Referring to FIG. 1 of the accompanying drawings, the feed area is indicated at 1 and the bale chamber at 2. The feed mechanism for moving the crop material from the feed area 1 to the bale chamber 2 comprises two rotatable sprockets 3 and 4 around both of which passes a chain 5 a link of which is attached to a leading end of a first elongated support member 6 carrying three depending fingers 7, 8 and 9. The support member 6 is tubular and the trailing end thereof (considering the member 6 moving from right to left during an operative stroke) telescopically receives the leading end of a second elongated support member 10, the trailing end of which is pivotally connected to the radially outer end of a rotatable crank arm 12. The sprocket 3 receives motive power from the pulling tractor (not shown) via a number of intermediate transmissions and drives the sprocket 4 through the chain 5. A transfer drive in the form of further sprockets 23, 24 mounted respectively on the spindle 11 and coaxially with the sprocket 4 and a further chain 15 links the sprocket 4 and the spindle 11 carrying the crank arm 12. When the sprockets 3 and 4 and the crank arm 12 rotate in the directions of the arrows shown in FIG. 1, the support members 6 and 10 undergo movement around a continuous loop-like path in a vertical plane, the member 10 sliding within member 6. On the lower run of the loop-like path, the fingers 7, 8 and 9 move from right to left during an operative stroke, engaging crop material within the feed area 1 and delivering crop material into the bale chamber 2, where a reciprocable baler plunger 25 is provided to compact the crop material into bales.

The locus of movement of the extremity of the finger 9 as the latter makes its operative stroke as shown by the line 13, and it will be seen that crop material lying within the volume bounded by this line 13 and the corner of the feed area 1 is not engaged by this feed finger, causing an accumulation of crop material in said corner. This ultimately results in an uneven feeding to the bale chamber.

Reference will now be made to FIGS. 2 and 3 of the accompanying drawings which show a baler according to the invention. Parts similar to those of FIG. 1 have been given the same reference numerals. It will be noted that the leading support member 6 carries a leading pair of feed fingers 7 and a trailing pair of feed fingers 9, the two fingers of each pair being laterally spaced in a direction perpendicular to the vertical plane occupied by the continuous loop-like paths described by the support members 6 and 10 during operation. Relative sliding movement of the trailing support member 10 within the leading tubular support member 6 is facilitated by bearings 16 shown towards the right-hand side of FIGS. 2 and 3. At the left-hand side of FIGS. 2 and 3 is shown the drive to the sprocket 3, this drive including a gearbox 17 the output shaft of which is coupled to the sprocket 3.

In accordance with the invention, the trailing end of the trailing support member 10 has fixed thereto a pair of laterally spaced feed fingers 18 which project substantially vertically downwardly of the support member 10 shown in FIG. 2. The trailing end of the trailing support member 10 is pivotally connected to the radially outer end of the crank arm 12 which is cranked in plan view (FIG. 3) in order to provide clearance for the bearings 16 as the latter move past the crank arm 12 during movement of the support members 6 and 10 in their continuous loop-like path. Hence, at the commencement of the lower run of the feed fingers, the extremities of the trailing pair of feed fingers 18 describe a curved path which is indicated at 19 in FIG. 2 and which ensures that crop material does not remain lodged in the corner of the feed area 1 remote from the bale chamber 2. This clearance of crop material is ensured by the steep angle of descent of the fingers 18 at the commencement of the lower run of the fingers 7, 9 and 18 on the one hand and by the fact that the fingers 18 are positioned further to the right than the fingers 9 of the prior art structure of FIG. 1 on the other hand.

The upper ends of the pair of fingers 18 are connected to a boss 20 formed at the trailing end of the member 10, the boss 20 forming a pivot bearing for the radially outer end of the arm 12. Each finger 18 may comprise an upper portion and a lower portion rigidly interconnected by bolts, as indicated at 22 in FIG. 2.

It will be noted that the lower ends of the feed fingers 18 are constrained to move in a circular path 19 while that the lower ends of the remaining feed fingers 7 and 9 are constrained to move in elongate continuous loop-like paths, a portion of one of which is shown at 13. It will further also be noted that the various paths 13 and 18 partially overlap each other whereby, in operation adjacent feed fingers 7-9-18 take over crop material from one another in a manner so that crop material is moved step by step from the outboard end of the feed area towards the inboard end thereof and is discharged ultimately into the bale chamber 2.

It is anticipated that aspects of the present invention, other than those specifically defined in the appended claims, can be obtained from the foregoing description and the drawings.

Having thus described the invention, what is claimed is:

1. A baler comprising:
 a feed area having first and second ends;
 a bale chamber, said first end of said feed area being adjacent said bale chamber;
 a pair of telescopically interconnected support members operably connected to said bailer for movement in loop-like paths, said support members sliding freely with respect to each other during movement in said loop-like paths;
 a first one of said support members moving adjacent said first end of said feed area;
 a second one of said support members moving adjacent said second end of said feed area;
 a first feed finger directly connected to said first support member; and
 a second feed finger directly connected to said second support member.

2. The baler of claim 1, wherein said first support member has an end connected for movement in an elongate loop-like path, said first feed finger being connected for corresponding movement in said elongate loop-like path adjacent said bale chamber.

3. The baler of claim 2 wherein said second support member has an end connected for movement in a circular path, said second feed finger being connected for corresponding movement in said circular path adjacent said second end of said feed area.

4. The baler of claim 3 wherein said elongate loop-like path overlaps said circular path.

* * * * *